Aug. 19, 1958     C. C. SIMMONS     2,847,791
FISHING LURE
Filed Nov. 8, 1954
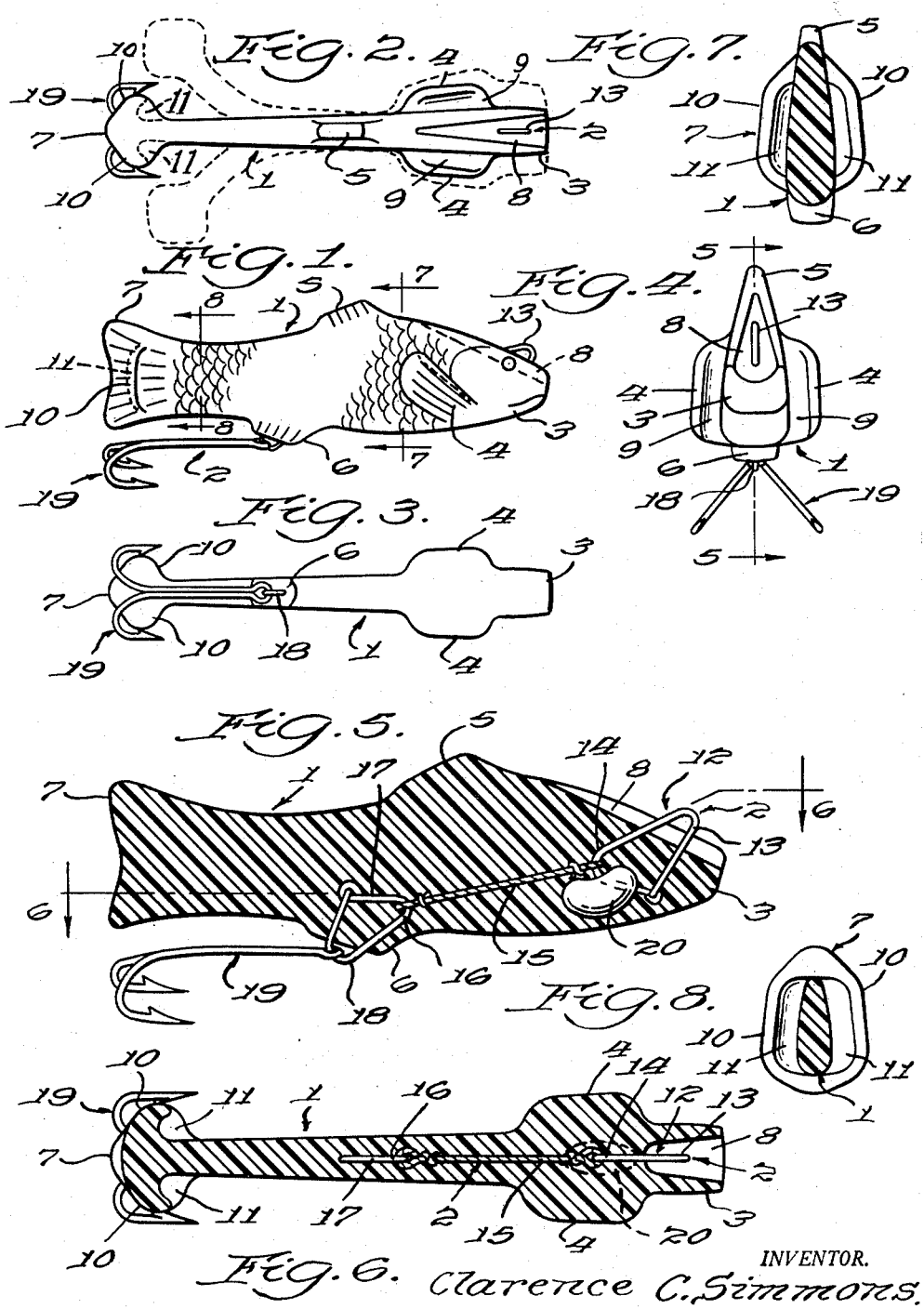
INVENTOR.
Clarence C. Simmons

2,847,791

FISHING LURE

Clarence C. Simmons, Hollywood, Calif.

Application November 8, 1954, Serial No. 467,407

9 Claims. (Cl. 43—42.26)

This invention relates to fishing lures and more particularly to an improved form thereof closely approximating a swimming minnow in form and action.

The principal object of the invention is to provide a fishing lure which in side elevation closely approximates a minnow and which is completely flexible to the end that its movement when dragged through the water will closely simulate the swimming motion of a minnow or other bait fish.

Another object of the invention is to provide a fishing lure of the above character which is so constructed and arranged that the body of the lure is only slightly subjected to strain when a fish is hooked.

A further object of the invention is to provide a flexible fishing lure which is so constructed that when on a slack line it will descend head first and maintain the simulation of swimming action.

Still another object of the invention is to provide a fishing lure in which the foregoing objectives are realized in practice, which is economical to manufacture and therefore readily saleable, and which is effective for its intended purpose.

With the foregoing objects in view, together with such additional objects and advantages as may subsequently appear, the invention resides in the parts, and in the construction, combination and arrangement of parts disclosed, by way of example, in the following specification, reference being had to the accompanying drawings which form a part of said specification and in which drawings:

Fig. 1 is a side elevation of a fishing lure embodying the invention,

Fig. 2 is a top plan view and additionally indicating in broken lines the movement of the lure when drawn through the water, Fig. 3 is a bottom plan view, Fig. 4 is an enlarged front end elevation, Fig. 5 is a medial sectional view taken on the line 5—5 of Fig. 4, Fig. 6 is a longitudinal sectional view taken generally along the line 6—6 of Fig. 5 and including the uppermost portions of the hook and leader assembly, Fig. 7 is a transverse sectional view taken on the line 7—7 of Fig. 1, and Fig. 8 is a transverse sectional view taken on the line 8—8 of Fig. 1.

The lure comprises a body formed of a very flexible, rubber-like plastic material; a highly plasticized vinyl material being an example of such material, together with a leader and hook assembly generally indicated by the numeral 2 having a portion thereof embedded or molded in situ in the body 1. The body 1 in side elevation generally resembles a fish in outline including a head 3, pectoral fin portions 4, 4, a dorsal fin 5, a ventral fin 6 and a tail 7; the side areas preferably being provided with a surface ornamentation resembling the scales and fin surface contour of a fish. The head and forward body portion are formed with a groove 8 which extends upwardly and rearwardly and which is relatively wide and deep at the nose and tapering to infinity slightly in front of the dorsal fin 5. The pectoral fin portions 4, 4 comprise protuberances extending outwardly from the sides of the body and their upper, rearwardly and upwardly sloping faces are formed into parallel grooves 9, 9. The tail 7 at each side thereof includes laterally extending projections 10, 10 at the rear end thereof; the front vertical faces of said projections being convex as viewed in side elevation and being formed as grooves comprising pockets 11, 11. The rear face of the tail portion is convexly curved as viewed in plan (see Figs. 2 and 6) and this convexly curved surface is concavely curved as viewed in side elevation (see Figs. 1 and 5). This configuration produces a negative pressure area in rear of the lure when it is pulled through the water with the minimum pressure being developed substantially in the longitudinal centerline of the lure body. At the same time, the front faces of the projections 10, 10 with their pockets 11, 11 build up a positive pressure with resultant creation of the lateral wiggling movement of the rear portion of the flexible body; the greater depth of the body at the ventral and dorsal fin portions and the lateral stiffness deriving from the pectoral fin portions serving to keep the forward portion of the body relatively rigid. The movement of the tail from side to side is, however, accompanied by a slight movement of the head in the same lateral direction as the tail deriving from the pressure of the water against the curved tail portion. Other than the said pectoral fin protuberances and the said lateral projections at the tail, the body is of substantially uniform thickness tapering slightly from head to tail.

The leader and hook assembly 2 comprises a front ring 12 of triangular form and positioned to have a corner thereof protrude through the body 1 in the groove 8 to form an eye 13 for attachment of the line or leader to the lure. Within the body 1 another corner 14 of the ring 12 is connected by a flexible number 15 with one corner 16 of a second triangular ring 17 embedded in the body 1 with another corner 18 protruding through the ventral fin 6 and carrying a hook 19 here shown as a double pointed hook. The surface of the ventral fin through which the corner 18 of the ring 17 projects is substantially the same width as the body of the lure and the projection of the said ring corner is just sufficient for the free action of the eye of the hook thereon. This serves to limit the range of movement of the hook so that the hook points will not foul themselves in the tail portion of the lure. The flexible member may be of any suitable material which has sufficient tensile strength and which is substantially as flexible as the body material. A nylon cord or braid or a cable formed from very fine wires such as are used for fishing leaders is satisfactory. The triangular rings and leaders are so arranged that any pull, as from a hooked fish, is not transmitted in a straight line through the assembly as best shown in Fig. 5, but effects a slight clockwise movement of the ring 12 and also, a slight clockwise movement of the ring 17 with resultant momentary distortion of the resilient body material and consequent shock absorbing effect on the fishing line.

Preferably, also the front ring 12 carries a small weight 20 to give the lure a loading at the front end thereof which will keep the lure right side up and also cause it to descend head first when on a slack line.

When the lure is pulled through the water, the upwardly and rearwardly inclined surfaces comprising the grooves 8 and 9, will cause the lure to try to descend. At the same time the resistance of the grooved front faces or pockets 11, 11 of the projections 10, 10 will produce a wiggling motion of the tail, which due to the flexible characteristic of the body material will extend in part to the head portion resulting in a close simulation of a swimming fish; the nature of the action being shown in broken lines in Fig. 2.

All of the components are cheap to manufacture and when thus assembled and combined produce a lure that has a true swimming action. It is appreciated that in the light of the foregoing disclosure of a preferred mode of execution of the invention, changes and modifications may suggest themselves to others skilled in the art. With this in mind, the invention is not to be deemed to be limited to the exact form thereof disclosed by way of example, but to include as well all such changes and modifications in the parts and in the construction, combination of parts as shall come within the purview of the appended claims.

I claim:

1. In a fishing lure, a body formed of soft, rubber like material shaped to resemble a fish including simulations of a head, body and tail and pectoral, dorsal and ventral fins as viewed in side elevation, a ring element embedded in said body and having a portion thereof exposed at the upper surface of said head affording means for connection of the lure to a fishing line, a second ring embedded in said body and having a portion thereof extending through said ventral fin, a fish hook carried by said second ring, and a flexible member embedded in said body and interconnecting said rings, said body including upwardly and rearwardly inclined surfaces effective to cause said lure to descend when dragged through the water, and said tail including forwardly facing surfaces disposed one each at each side thereof opposing movement of the lure through the water and by such opposition being effective to impart a lateral wiggling movement to said lure in close simulation to the natural swimming movement of a fish; the body of said lure in rear of the ventral fin portion being of less cross sectional area than the forward portion of said body with consequent greater flexibility and resultant concentration of the greater portion of said wiggling movement to said rear portion of the body and achievement of said close simulation.

2. A lure as claimed in claim 1 in which said upwardly and rearwardly inclined surfaces comprise a rearwardly diminishing groove formed in the upper surface of said head simulation and the rearwardly and upwardly inclining top surfaces of a pair of projections extending laterally from opposite sides of said body and which, as viewed in side elevation constitute the pectoral fin simulations of said body.

3. A lure as claimed in claim 1 in which said body includes a weight fixed to said first ring and embedded in said body; said weight being effective both to keep said lure right side up when immersed in water and to cause said lure to descend head foremost when allowed slack line.

4. A lure as claimed in claim 1 in which the rear end surface of said tail portion is convexly curved as viewed in top plan with resultant formation of a minimum pressure area at the rear end of the lure as it is dragged through the water which combines with the positive pressures developed by said forwardly facing surfaces to increase the capacity thereof to produce said wiggling movement.

5. In a fishing lure a flexible, resilient body simulating a fish in side elevation; said body including head, tail and ventral fin portions and having means adjacent the head portion of said body for attaching said lure to a fishing line, means projecting out of the ventral fin portion of said body for attaching a fish hook, a fish hook carried by said last named means, a flexible member connecting said first named and said last named means, and integrally formed means on the tail portion of said body to impart a lateral wiggling movement to the portion of said body rearwardly of said ventral fin portion in simulation of the swimming action of a fish when said lure is drawn through the water.

6. A lure as claimed in claim 5 in which said wiggling motion producing means on said tail comprises laterally extending projections at each side of the tail portion of said body each presenting a front surface substantially normal to the direction of travel of said lure when drawn through the water; the rear ends of said projections at said tail being at least slightly forked as viewed in side elevation and the rear end face of said tail portion and said projections being convexly curved as viewed in plan with resultant formation of a maximum negative pressure area at the center line of said lure.

7. A lure as claimed in claim 5 in which said body includes a pair of lateral projections disposed one at each side of said body; each of said projections in side elevational configuration simulating a pectoral fin and having an upwardly and rearwardly sloping upper face, and in which said head portion includes an upwardly and rearwardly sloping upper surface having a rearwardly diminishing groove formed therein; said groove and said upper surfaces serving as inclined planes effective to cause said lure to descend when drawn through the water and said lateral projections serving locally to reduce the flexibility of said lure.

8. In a fishing lure, a body formed of soft rubber-like material shaped to resemble a fish and including simulations of a head, body, tail and fins, as viewed in side elevation, a ring element embedded in said body and having a portion thereof exposed at the upper portion of said head affording means for connection of the lure to a fishing line, a second ring embedded in said body and having a portion thereof exposed at the lower edge of the ventral area of said body in the region of the ventral fin and affording means for attachment of a fish hook to said body, a member embedded in said body and connecting said rings effective to transmit the pull of a hooked fish to the fishing line without imposition of tension on said body, said body including upwardly and rearwardly inclined surfaces effective to cause said lure to descend when dragged through the water, and said tail including forwardly facing surfaces disposed one at each side thereof opposing movement of the lure through the water and consequently being effective to impart a lateral wiggling movement to said lure in close simulation to the natural swimming movement of a fish, the body of said lure in rear of said last named ring being of less cross-sectional area than the forward portion of said body with consequent greater flexibility and resultant concentration of the greater portion of said wiggling movement to said rear portion of the body and achievement of said close simulation.

9. In a fishing lure a flexible resilient body simulating a fish in side elevation; said body including head, tail and fin portions and having a first means adjacent the head portion thereof for attaching said lure to a fishing line and a second means projecting out of the ventral area of said body for attaching a fish hook, a member connecting said first and second means effective to transmit the pull of a hooked fish directly to the fishing line, and an integrally formed means on said tail portion of said body effective to impart a lateral wiggling movement to the portion of said body rearwardly of said last named means in simulation of the swimming action of a fish when said lure is drawn through the water.

References Cited in the file of this patent

UNITED STATES PATENTS

| | | | |
|---|---|---|---|
| D. 56,707 | Nash | Nov. 30, 1920 |
| 843,256 | Bowersox | Feb. 5, 1907 |
| 1,791,316 | Jordan | Feb. 3, 1931 |
| 2,437,549 | Pecher | Mar. 9, 1948 |
| 2,526,115 | Boyette | Oct. 17, 1950 |
| 2,641,862 | Poe | June 16, 1953 |
| 2,684,551 | Hall | July 27, 1954 |
| 2,764,836 | Webber | Oct. 2, 1956 |

FOREIGN PATENTS

| | | |
|---|---|---|
| 393,514 | Great Britain | 1933 |